United States Patent
Brubacher et al.

(10) Patent No.: US 12,363,838 B2
(45) Date of Patent: Jul. 15, 2025

(54) TAMPER DETECTION FOR INTRINSICALLY-SAFE OR EXPLOSION-PROOF ENCLOSURES

(71) Applicant: Blackberry Limited, Waterloo (CA)

(72) Inventors: Jonathan Quinn Brubacher, Waterloo (CA); Mahendra Fuleshwar Prasad, Waterloo (CA); Yu Gao, Waterloo (CA); Scott Leonard Dill, Paris (CA); Cortez Corley, Waterloo (CA); Ying Tong Man, Waterloo (CA)

(73) Assignee: BlackBerry Limited, Waterloo (CA)

( * ) Notice: Subject to any disclaimer, the term of this patent is extended or adjusted under 35 U.S.C. 154(b) by 253 days.

(21) Appl. No.: 18/303,143

(22) Filed: Apr. 19, 2023

(65) Prior Publication Data

US 2024/0357754 A1  Oct. 24, 2024

(51) Int. Cl.
| | |
|---|---|
| H05K 5/02 | (2006.01) |
| G01S 5/00 | (2006.01) |
| G06F 21/86 | (2013.01) |
| G08B 29/04 | (2006.01) |
| H04W 4/029 | (2018.01) |
| H05K 5/13 | (2025.01) |

(52) U.S. Cl.
CPC .......... *H05K 5/0208* (2013.01); *G01S 5/0009* (2013.01); *G06F 21/86* (2013.01); *G08B 29/046* (2013.01); *H04W 4/029* (2018.02); *H05K 5/0209* (2022.08); *H05K 5/0247* (2013.01); *H05K 5/13* (2025.01)

(58) Field of Classification Search
CPC ...... H05K 5/0208; H05K 5/0247; H05K 5/13; G01S 5/0009; G08B 29/046; H04W 4/029; G06F 21/86
See application file for complete search history.

(56) References Cited

U.S. PATENT DOCUMENTS

| | | | |
|---|---|---|---|
| 9,008,993 B2* | 4/2015 | Rich | G01R 22/066 |
| | | | 361/708 |
| 10,911,916 B2 | 2/2021 | Verma et al. | |
| 11,495,121 B2* | 11/2022 | Grobelny | H01M 50/20 |

(Continued)

FOREIGN PATENT DOCUMENTS

| | | |
|---|---|---|
| CN | 115742719 A | 3/2023 |
| KR | 102204239 B1 | 1/2021 |
| WO | 2012047321 A1 | 4/2024 |

OTHER PUBLICATIONS

EPO: Extended European Search Report relating to EP application No. 24170703.3, dated Sep. 6, 2024.

*Primary Examiner* — John A Tweel, Jr.
(74) *Attorney, Agent, or Firm* — Conley Rose, P.C.; J. Robert Brown, Jr.

(57) ABSTRACT

Devices and methods for detecting and reporting a battery tamper event with regard to an intrinsically-safe or explosion-proof device while the device is located in a hazardous environment. The device may include a location sensor for determining that the device is in a hazardous location. While in the hazardous location, the device may detect an open enclosure event using a sensor and, if so, it may monitor for detection of a battery tampering event. The battery tampering event may include battery replacement or battery charging. The battery tamper event may be reported to a remote server over a wireless channel when it occurs.

18 Claims, 6 Drawing Sheets

(56) References Cited

U.S. PATENT DOCUMENTS

2002/0191372 A1  12/2002  Mancini et al.
2007/0229026 A1  10/2007  Morioka et al.
2009/0081963 A1   3/2009  Boren
2022/0345878 A1  10/2022  Thotton Veettil et al.

* cited by examiner

TAMPER DETECTION FOR INTRINSICALLY-SAFE OR EXPLOSION-PROOF ENCLOSURES

FIELD

The present disclosure relates to intrinsically-safe or explosion-proof enclosures for electronics and methods and devices for detecting improper use of those enclosures.

BACKGROUND

Some electronic devices may be intended for use in hazardous environments. Various regulations govern the qualification of electronic devices for use in such environments. In some cases, a device may be designed to meet "intrinsically-safe" design requirements, such as IEC60079-1. In some cases, a device may be designed to meet "explosion-proof" design requirements. Most such devices are housed within an enclosure and may be powered by a battery.

In either situation, one of the general requirements may be that a user not open the enclosure of the electronic device in a hazardous or explosive environment. Another requirement may be that the user not replace or recharge a battery within the electronic device when in the hazardous environment.

BRIEF DESCRIPTION OF THE DRAWINGS

Reference will now be made, by way of example only, to the accompanying drawings which show example embodiments of the present application, in which.

DETAILED DESCRIPTION

Figure 1:
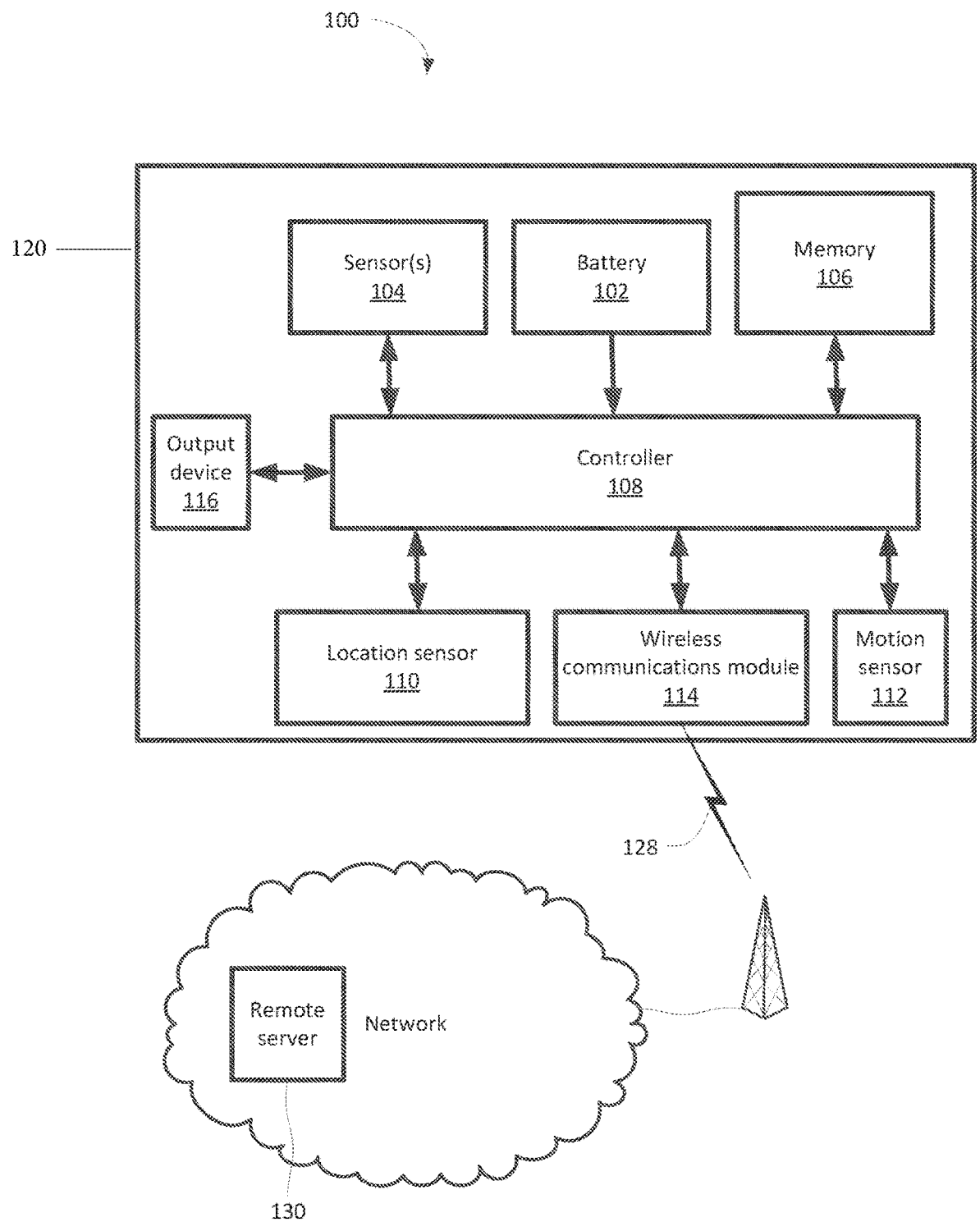
FIG. 1 is a simplified block diagram of an asset tracking device.

In one aspect, the present application describes an electronic wireless device deployed for use in potentially hazardous locations. The device may include an enclosure; a battery; a sensor generating a first signal indicative of an open enclosure event indicating the enclosure has been opened; a wireless communication module; a location sensor; and a controller configured to receive the first signal and to receive a second signal indicating a battery tamper event, to determine that the electronic wireless device is located in a hazardous environment and, responsive to that determination and based on detection of both the open enclosure event and the battery tamper event, to generate and transmit a tamper report to a remote server over a wireless communication channel using the wireless communication module.

In some implementations, the device may further include a location sensor to output geolocation data to the controller, and wherein the controller is configured to compare the geolocation data from the location sensor with data defining hazardous locations to determine that the electronic wireless device is located in the hazardous environment.

In some implementations, the device may further include a location sensor to output geolocation data to the controller, and wherein the controller is configured to determine that the electronic wireless device is located in the hazardous environment by relaying the geolocation data to the remote server and receiving, from the remote server, a message indicating that the geolocation data corresponds to a hazardous location.

In some implementations, the sensor includes an ambient light sensor and the first signal is generated based on the ambient light exceeding a threshold level.

In some implementations, the enclosure includes an enclosure base and a cover secured to the enclosure base by metal screws inserted in bore holes within the enclosure base, and wherein the enclosure base includes conductive traces connecting the metal screws in series, and wherein the sensor includes an open circuit sensor configured to detect removal of one or more of the metal screws.

In some implementations, the sensor includes a magnetic sensor, an inductive sensor, a capacitive proximity sensor, or a mechanical switch.

In some implementations, the second signal is received by the controller from the battery, wherein the second signal includes a serial number, wherein the controller is configured to compare the serial number to a previous serial number stored in memory, and wherein the controller is configured to detect the battery tamper event based on a mismatch between the serial number and the previous serial number.

In some implementations, the second signal is a battery power signal, wherein the controller is configured to compare a voltage level of the battery power signal to a previous voltage level stored in memory, and wherein the controller is configured to detect the battery tamper event based on the voltage level exceeding the previous voltage level by more than a threshold amount.

In some implementations, the device further includes non-volatile memory, wherein the controller is configured, following a power cycle event, to determine that the electronic wireless device is located in the hazardous environment and that the open enclosure event has occurred while in the hazardous environment by reading the non-volatile memory and, in response to those determinations, to determine from the second signal that the battery tamper event has occurred.

In some implementations, the electronic wireless device is an intrinsically-safe device or an explosion-proof device.

In another aspect, the present application describes a method of recording and reporting a tamper event for an electronic wireless device. The method may include determining that the electronic wireless device is located in a hazardous environment and, responsive to that determination, detecting a first signal from a sensor in the electronic wireless device indicating an open enclosure event, wherein the electronic wireless device has an enclosure and the open enclosure event indicates the enclosure has been opened; detecting a second signal indicating a battery tamper event; and based on detection of both the open enclosure event and the battery tamper event, generating and transmitting a tamper report to a remote server over a wireless communication channel.

In some implementations, determining that the electronic wireless device is located in the hazardous environment includes obtaining geolocation data using a location sensor and comparing the geolocation data to data defining hazardous locations to determine that the electronic wireless device is located in the hazardous environment. In some cases, comparing includes transmitting the geolocation data to the remote server, comparing the geolocation data to the data defining hazardous locations at the remote server, and receiving at the electronic wireless device from the remote server a message indicating that the geolocation data corresponds to a hazardous location.

In some implementations, the sensor includes an ambient light sensor and wherein detecting the first signal includes detecting the first signal generated by the ambient light sensor based on the ambient light exceeding a threshold level.

In some implementations, the enclosure includes an enclosure base and a cover secured to the enclosure base by metal screws inserted in bore holes within the enclosure base, and wherein the enclosure base includes conductive traces connecting the metal screws in series, and wherein the sensor includes an open circuit sensor, and wherein detecting the first signal includes detecting an open circuit signal from the open circuit sensor based on removal of one or more of the metal screws.

In some implementations, detecting the first signal includes detecting a signal indicating removal of a cover from the enclosure using a magnetic sensor, an inductive sensor, a capacitive proximity sensor, or a mechanical switch.

In some implementations, detecting the second signal includes receiving the second signal from the battery, wherein the second signal includes a serial number, comparing the serial number to a previous serial number stored in memory, and detecting the battery tamper event based on a mismatch between the serial number and the previous serial number.

In some implementations, detecting the second signal includes measuring a voltage level of a battery power signal, comparing the voltage level to a previous voltage level stored in memory, and detecting the battery tamper event based on the voltage level exceeding the previous voltage level by more than a threshold amount.

In some implementations, the method may further include detecting a power cycle event and, following the power cycle event, determining that the electronic wireless device is located in the hazardous environment and determining that the open enclosure event has occurred based on reading a non-volatile memory and, in response to those determinations, determining from the second signal that the battery tamper event has occurred.

Opening an intrinsically-safe or explosion-proof device in a hazardous environment may allow gasses or dust to enter the enclosure, increasing the incendiary risk. Disconnecting or connecting a battery could result in risk of a spark. Charging a battery is typically more hazardous than simply using a battery. For instance, Li batteries have a greater risk of thermal run-away during charging, and typically a greater heat buildup during charging. All these risks underscore the importance of not opening such a device and tampering with the battery while in a hazardous environment. Users are typically cautioned not to engage in such activity in the device user manual, or on warning labels or stickers on the device itself. However, this obviously relies on voluntary user compliance. Owners or operators of such devices may want to ensure that their on-site users are meeting those expectations.

Many of these devices may not always be in a hazardous environment and may not typically be in a hazardous environment. In some situations, there is only a possibility that the device may enter a hazardous environment, but it may normally operate in non-hazardous locations. This is particularly the case when the electronic device is intended for movement from location to location. For example, an asset tracking device typically travels to a number of different locations. Some or none of those location may be hazardous locations. An asset tracking device may be attached to a pallet, container, shipping container, intermodal container, truck chassis, train chassis, or other such asset that moves from location to location, some of which may be classed as hazardous locations, i.e. hazardous environments.

Reference is now made to FIG. 1, which shows in block diagram form a simplified example of an electronic wireless device in accordance with the present application. In this example, the electronic wireless device may be an asset tracking device 100. The device 100 may include one or more batteries 102 to power the device 100. The battery 102 may be rechargeable or replaceable, and device 100 may further include battery charging circuitry (not shown) to receive charge from an external power source.

The asset tracking device 100 further contains at least a sensor 104, a controller 108, a location sensor 110, and a wireless communication module 114. In some examples, the device 100 may further include a non-volatile memory 106, a motion sensor 112, and/or an output device 116. In various implementations, the memory 106 may be part of the controller 108 or may be external memory.

The controller 108 may include a processor and memory or data storage. The controller 108 may be a programmable microcontroller, an application specific integrated circuit, or other such computing devices capable of receiving and outputting signals and executing computer-readable instructions to carry out operations and functions, such as those describe herein.

The location sensor 110 may output geolocation data. The location sensor 110 may include a global navigation satellite system (GNSS) chip in some implementations. The GNSS chip receives signals from a plurality of satellites, comparing the difference in time it takes to receive the signals from each satellite and utilizing this information to determine the location of the chip based on the relative positions of the satellites. An alternative to GNSS tracking is to use received cellular signals from local cellular towers in a process known as cellular triangulation. Cellular triangulation functions similar to GNSS, utilizing terrestrial cellular towers to triangulate a position rather than satellites. As such, cellular triangulation does not require a clear view of the sky, however in situations where a clear view of the sky is available, it tends to be less accurate than GNSS tracking. In yet other situations, an asset tracking device may determine its location based on the receipt of other wireless signals, such as from a Bluetooth beacon or other wireless beacon, or from a wireless local area network, e.g. WiFi, broadcast signal.

In some cases, the location sensor 110 may include a Bluetooth or other short-range beacon signal receiver capable of detecting local wireless beacons, wherein the local wireless beacon may contain data or a code indicative of a hazardous environment.

The wireless communication module 114 may include a cellular transceiver configured to connect to one or more wireless network, such as a wide area network (WAN) providing data connectivity. The wireless communication module 114 may be configured to establish a wireless communication channel 128 over one or more data networks, including one or more cellular data networks, the Internet, and/or other data networks, to connect to a remote server 130. The device 100 may be configured to periodically wake up, determine its location, and connect to the remote server 130 to send a location report containing data regarding the device and one or more time-stamped location coordinates.

The components of the asset tracking device 100 are housed within an enclosure 120. The enclosure 120 may be designed to enable operation of the device 100 in hazardous environments and may comply with various regulatory requirements for electronic equipment in such situations. One of the requirements is typically that a battery should not be replaced or recharged while within the hazardous environment. Meeting this requirement is typically dependent on user compliance.

The sensor 104 is configured to output a first signal to the controller 108 indicative of whether the enclosure 120 has been opened. In various embodiments, the sensor 104 may be an ambient light sensor, an infrared (IR) proximity sensor, a capacitive proximity sensor, an inductive sensor, a magnetic sensor, or a circuit-break sensor.

In yet another implementation, the sensor 104 may be one of the RF antennas within the device. In such an example, a parasitic element may be placed on the inside of the enclosure cover, such that it is capacitively coupled to the antenna structure and such that removal of the cover results in a change to the antenna impedance to a detectable degree. An active RF sensing circuit may be employed to measure reflected power from the antenna. If the controller detects that the antenna impedance changes by more than a threshold amount based on a change in reflected power, then it determines that the parasitic element, and thus the cover, have been removed. The RF antenna may be a cellular antenna, a 2.4 GHz antenna, or any other RF antenna.

Any one of such sensors may be implemented such that the first signal indicates a condition or state in which the enclosure 120 has been opened. The enclosure 120 may include parts or a cover that is secured with screws or other fasteners to seal the enclosure 120 but to permit opening for maintenance or battery replacement. The sensor 104 detects opening of the cover in some implementations.

The controller 108 may be configured to determine when the device 100 has entered a hazardous environment. Using location data, e.g. geolocation data, from the location sensor 110 the controller 108 may compare the location data with data stored in memory, such as memory 106, that details the geographical locations of known hazardous environments. In some cases, the controller 108 may relay location data to the remote server 130 and the remote server may determine from the location data that the device 100 is in a hazardous location and may, as a result, transmit a message back to the controller 108 over the wireless channel 128 indicating that the device 100 is in a hazardous location. The controller 108 may store that state in memory 106 to log the fact it is in a hazardous location.

In some cases, the location data may be GNSS data, or may be a short-range local wireless signal, such as a local beacon broadcast signal, indicating that the device 100 is in a hazardous environment.

If the controller 108 determines, either on its own or together with the remote server 130, that the device 100 is in a hazardous location and, based on the first signal from the sensor 104, that the enclosure has been opened while in the hazardous location, then the controller 108 may determine whether a battery tamper event has occurred. In some cases, the battery tamper event includes a replacement of the battery. In some cases, the battery tamper event includes a recharging of the battery.

Battery replacement may be detected on the basis of a change in the battery serial number, in some implementations. In some other cases, it may be detected on the basis of a more than threshold increase in battery voltage. The controller 108 may be configured to periodically record a battery voltage value in memory and to compare a current battery voltage reading with a most-recently recorded battery voltage reading. A change in voltage representing an increase more than a threshold value may indicate a battery replacement event or a battery charging event.

The controller 108 may be configured to generate and transmit a message to the remote server 130 regarding detection of a battery tamper event while in a hazardous environment. The remote server 130 may log that event, may transmit an alert to an administrator, and/or may generate and send a notification to one or more accounts associated with the asset tracking device 100, such as an owner/administrator account. In this manner, when a user violates policy to engage in battery tampering while the device is in a hazardous environment, the event is detected, reported, and suitable sanction or enforcement activity might then take place.

The output device 116 may include one or more LEDs, which may be visible from outside the enclosure. The output device 116 may alternatively or additionally include a speaker or other audio output device. The controller 108 may be configured to cause output of a visual and/or auditory signal using the output device 116. For example, upon detection of a hazardous environment, the LEDs may be illuminated a certain colour. In another example, upon detection of an open enclosure condition the LEDs and/or speaker may output an alarm signal.

Figure 2:
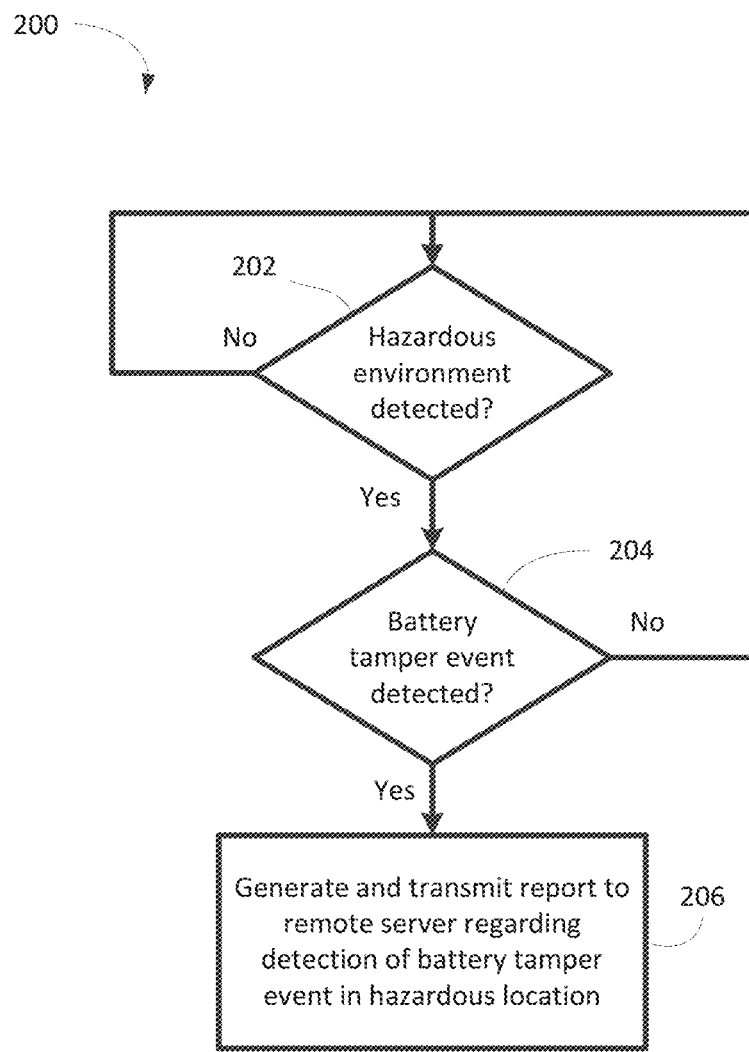
FIG. 2 is a simplified flowchart showing an example method of detecting and reporting a battery tamper event.

Reference is now made to FIG. 2 showing one simplified example method 200 for logging battery tamper events with respect to a deployed wireless electronic device. The method 200 may be implemented using the asset tracking device 100 (FIG. 1) in some examples.

In operation 202, the device determines that it is in a hazardous environment. In one example, the device does so by using its GNSS chip to determine its geographical location and then comparing that location to a stored set of geographical data defining one or more hazardous environment locations. The one or more hazardous environment locations may be defined by a geofence describing the boundaries of the locations. In some cases, the device may relay the geographical location data to the remote server, which may compare the location to known hazardous environment locations, and then transmit a message to the device informing it that it is presently in a hazardous location.

In another example, the device receives a beacon signal or other short-range wireless signal containing a code or other indicator signaling that it is a hazardous location. On this basis, the device determines that it has entered a hazardous location. In some cases, there may be two or more beacons signaling a hazardous location and the device may be configured to determine that it is in the hazardous location only if it detects both of the two or more beacon signals.

If the device is not in a hazardous location, then it remains at operation 202. If the device determines that it is in a hazardous location, then it determines whether a battery tamper event has been detected in operation 204. If not, it returns to operation 202 to determine if it is still in a hazardous location. If a battery tamper event is detected in operation 204, then the device may transmit a report regarding the battery tamper event to a remote server in operation 206.

The battery tamper event may be detected based on one or more techniques, or combination of techniques. In some examples, the batter tamper event is dependent upon first detecting that the device enclosure has been opened. If the device enclosure has been opened, then the device may determined whether a battery replacement or battery charging event is detected. In some cases, the device enclosure opening event may be logged in non-volatile memory so that if a power off event occurs, e.g. due to removal of the battery, then the device may determine when it powers on that the enclosure was opened while in a hazardous environment prior to being powered off. It may then assess whether it was just a power cycle or whether a battery replacement or battery charge event occurred.

In some cases, battery replacement may be detected by the controller by comparing a battery serial number with a serial number stored in memory to see if the battery serial number changed. Some batteries may be configured to output not only a power signal but also a control signal encoding certain data, such as the battery serial number.

In some cases, battery replacement or charging may be detected based on a larger-than-threshold change in battery voltage. In particular, an increase in battery voltage by more than a threshold amount may be indicative of a likely battery replacement or battery charging. The controller may be configured to periodically record the battery voltage in non-volatile memory such that following a power cycle event it can measure the current battery voltage and compare it to the most-recently recorded battery voltage stored in non-volatile memory to determine whether the battery voltage has increased by more than a threshold amount. As an example, the threshold may be set as a fixed number of millivolts or a percentage of the previously-recorded battery voltage.

Figure 3:
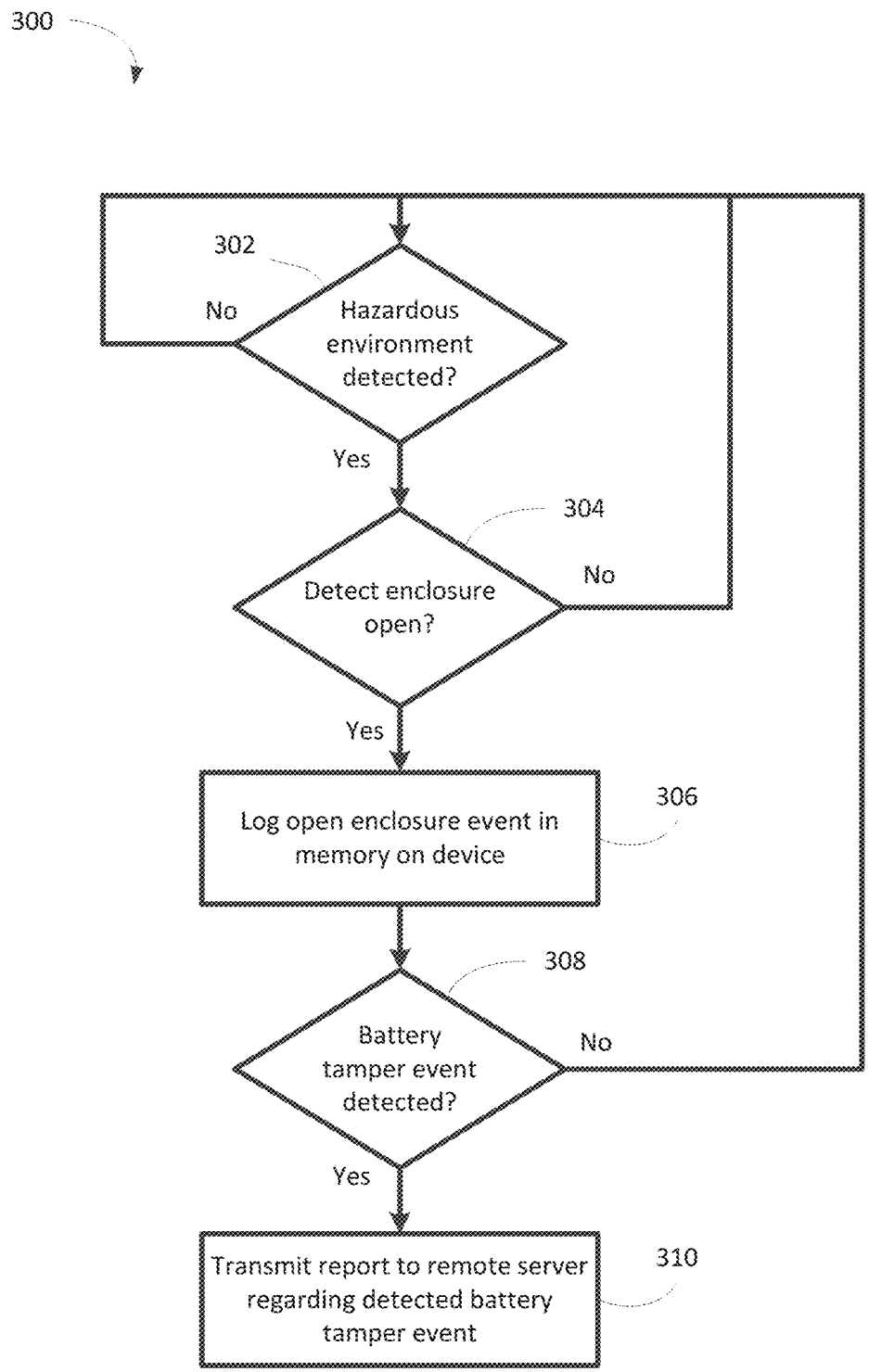
FIG. 3 shows one example method for detecting and reporting battery tamper events with regard to a deployed electronic device.

FIG. 3 illustrates, in flowchart form, one example method 300 for detecting and reporting battery tamper events with regard to a deployed electronic device. The electronic device may be an intrinsically-safe or explosion-proof device in some cases. The electronic device may be an asset-tracking device. The electronic device has a battery and wireless communication capabilities enabling it to obtain wireless connectivity with a wide area network, such as a cellular data network, and to send and receive communications with a remote server via the wide area network.

In operation 302, the device determines whether it is in a hazardous environment. As noted above, the determination may be based on determining a geographic location in some implementations, for example using a GNSS chip and received satellite signals, or using cellular triangulation and received cellular tower signals, or using a short-range communication chip and one or more received broadcast beacon signals. If not in a hazardous environment, then the device continues to monitor for entry into a hazardous location.

In many implementations, the device may maintain a low power or sleep state for a majority of the time and may periodically wake up in order to obtain location data and/or other sensor data and, in some cases, to generate and transmit a location report to the remote server. During this wake-up period, the device may carry out operation 302 to assess whether it has entered (or remains in) a hazardous location, and the other operations of the method 300. The device may be configured to wake-up more frequently based on movement detected by a motion sensor that if the motion sensor indicates that the device is stationary.

As noted above, the device may relay its geographical location to the remote server, which may compare the device's location with location data for one or more hazardous environments and may send a reply to the device containing an indication of whether the device is in a hazardous environment or not.

If the device determines that it is in a hazardous environment, then in operation 304 the device determines whether the enclosure has been opened. An open enclosure event may be detected using one or more sensors relating to the enclosure. In some implementations, the sensors may include an ambient light sensor to detect if the cover has been opened. In some implementations, the sensors may include a low power electrical circuit break detector designed to detect a conductivity break if the enclosure or a fastener securing the enclosure is removed. In some cases, the sensors may include an inductive sensor, a capacitive proximity sensor, or other such sensors for detecting removal of a cover. Any other such sensors capable of detecting an enclosure opening event may be used, alone or in combination with other sensors. The enclosure opening event may occur at a time other than a wake time, so the device may be configured to log occurrence of the enclosure opening event in non-volatile memory, as indicated by operation 306. In some cases, operation 304 includes determining whether the enclosure is currently open, i.e. a real-time determination of whether an open enclosure event is occurring.

If an open enclosure event has been detected and logged, then in operation 308 the device determines whether a battery tamper event has been detected. The battery tamper event may be detected based on a change in the battery serial number. In some cases, the battery tamper event may be detected based on a greater-than-threshold increase in battery voltage since a most-recently-recorded battery voltage level recorded in non-volatile memory.

Because a battery tamper event may include a power cycle, whereby power is completely removed from the device following the enclosure opening event of operations 304 and 306, when the power is restored, the device may read the non-volatile memory to determine whether it was most-recently in a hazardous environment and whether an enclosure opening event was detected. If so, then it continues the method 300 at operation 308 to assess whether a battery tamper event has occurred.

If no such battery tamper event is detected, then the device may return to operation 302 to re-evaluate whether it remains in a hazardous environment and whether the enclosure remains open.

If a battery tamper event is detected in operation 308, then in operation 310 the device generates and sends a communication to the remote server reporting the battery tamper event. The remote server may take action such as sending a notification to one or more accounts associated with the device regarding the battery tamper event.

As noted in the foregoing description, a battery replacement may result in a power cycle event with regard to the device. Prior to removal of the battery, the device may be configured to record detection of the hazardous environment in non-volatile memory and, if an open enclosure event is detected while in the hazardous environment, it may record detection of the open enclosure event in memory. In some cases, it may not record the hazardous environment event since the recordal of the open enclosure event is conditional on the device being located in a hazardous environment anyways.

Figure 4:
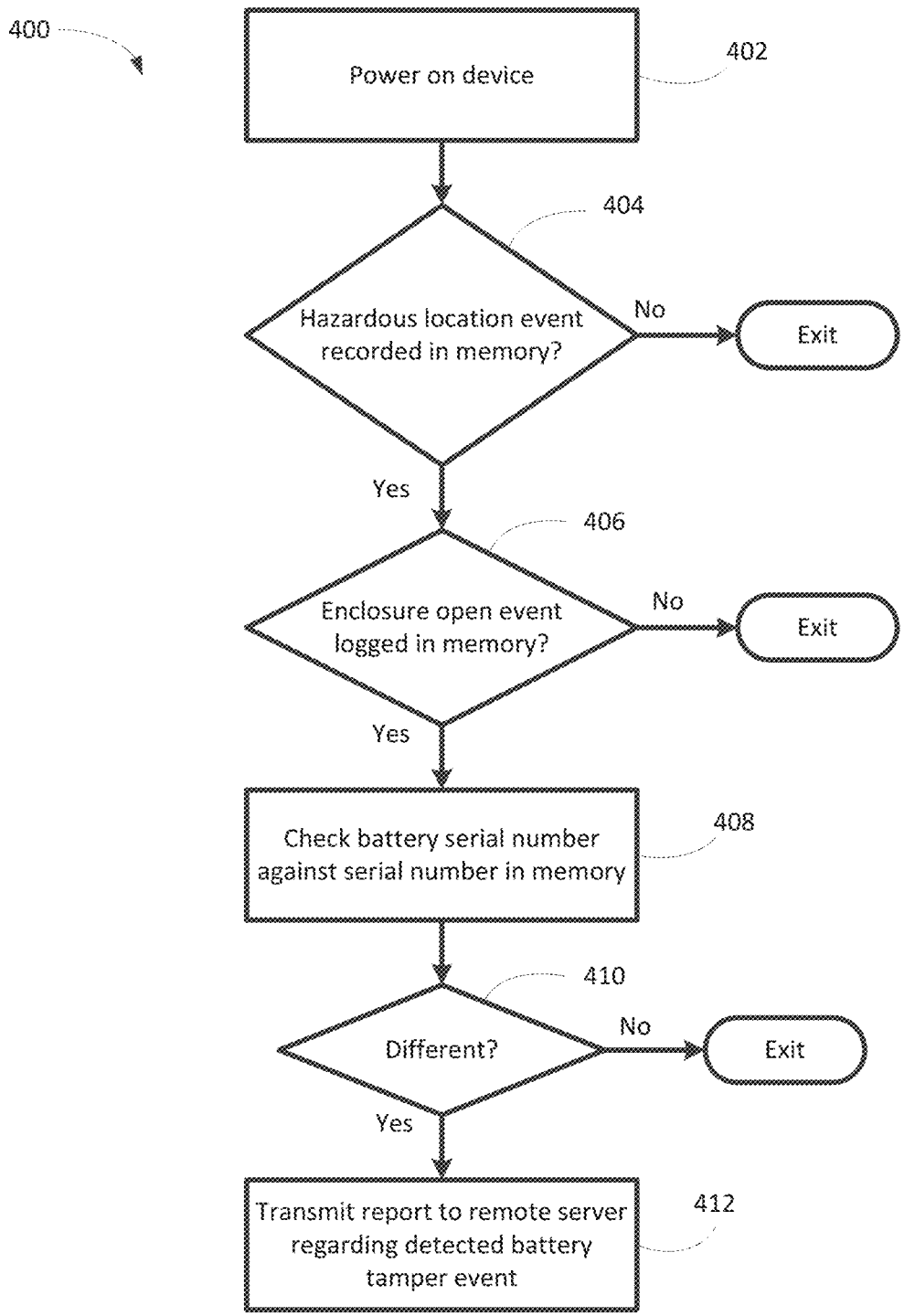
FIG. 4 shows one illustrative method of detecting and reporting battery tampering following a power cycle.

FIG. 4 shows one illustrative method 400 of detecting and reporting battery tampering following a power cycle. The method 400 may be implemented by way of processor-executable instructions stored in memory in an electronic device having a processor, where the instructions, when executed, cause the device to carry out the described operations. The electronic device may be an intrinsically-safe or explosion-proof device in some cases. The electronic device may be an asset-tracking device. The electronic device has a battery and wireless communication capabilities enabling it to obtain wireless connectivity with a wide area network, such as a cellular data network, and to send and receive communications with a remote server via the wide area network.

Operation 402 reflects a power on event. As the device powers up from a no power state, along with other start-up functions, it reads non-volatile memory to determine whether it was most-recently in a hazardous environment, as indicated by operation 404. If not, then the device carries out its normal start up functions and the method 400 exits. If so, then in operation 406 the device determines from data recorded in memory whether an open enclosure event was recorded while in the hazardous environment. As noted above, operations 406 and 404 may be implemented by only carrying out operation 406 if recordal of the open enclosure event is conditional on the device determining that it is in a hazardous environment the time of the open enclosure event is detected.

Assuming the open enclosure event while in a hazardous environment is indicated by data recorded in memory prior to the power outage, then the device reads the battery serial number in operation 408 and compares it to a battery serial number stored in non-volatile memory. In some cases, the battery may be configured to transmit its serial number to a controller via a serial communication bus or other such communication path within the electronic device. In some cases, the battery may be configured to output its serial number in a signal in response to receipt of a query signal from the controller. In either implementation, the controller obtains the battery serial number data from the battery and compares it to the most-recently recorded battery serial number. In operation 410, the controller determines whether the serial number has changed and, if so, in operation 412 it generates and sends a battery tamper event communication to the remote server informing it that the battery has been replaced while the device was in a hazardous environment.

Figure 5A:
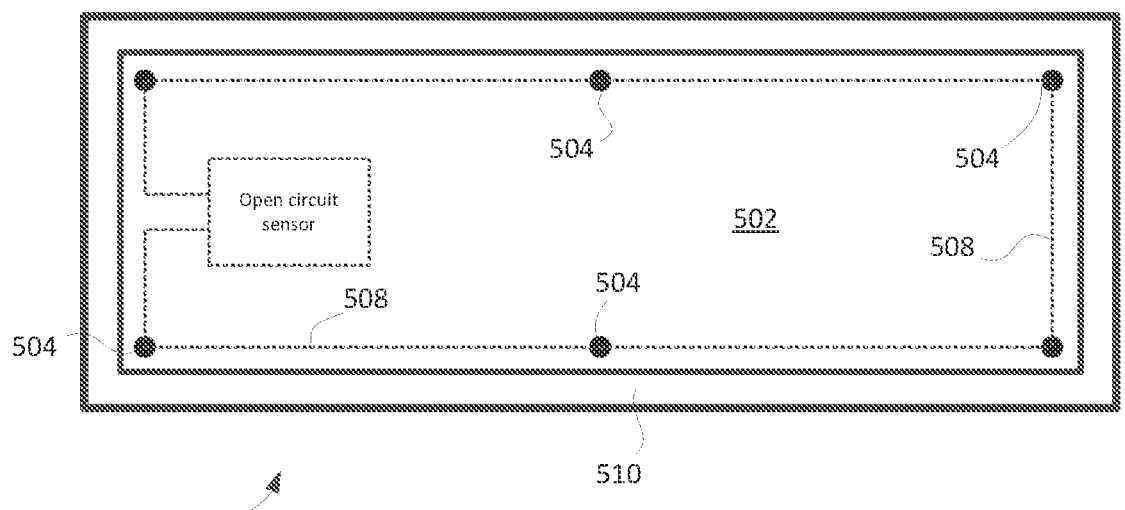
FIGS. 5A, 5B, and 5C diagrammatically illustrate one example of an enclosure open detection circuit.
Figure 5B:
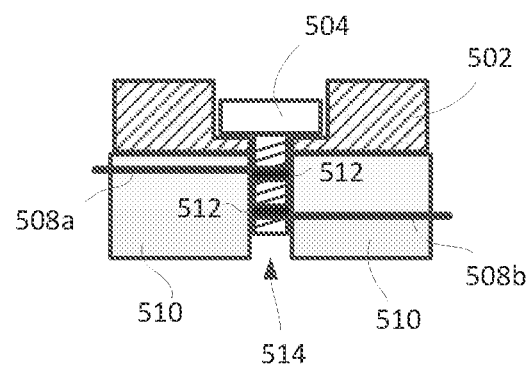
Figure 5C:
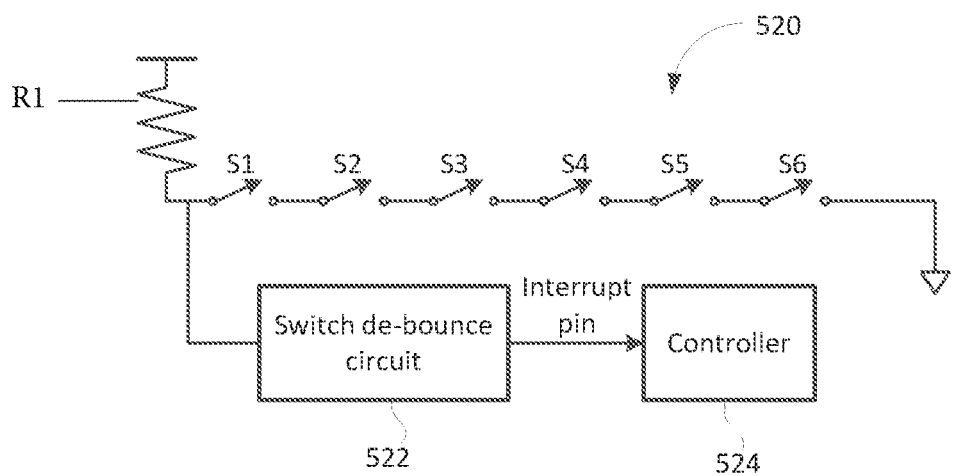

Reference will now be made to FIGS. 5A, 5B, and 5C, which diagrammatically depict one example of an enclosure open detection circuit. FIG. 5A shows a plan view of the top of an example enclosure 500 having a cover 502 secured in place by metal screws 504. The cover 502 and an underlying enclosure base 510 may be constructed of a non-conductive material, such as a plastic. The metal screws 504 may be conductive machine screws in some implementations.

Each of the metal screws 504 may be connected in a series electrical circuit by way of embedded conductive traces 508 within the enclosure base 510, shown in FIG. 5A in dashed lines. FIG. 5B shows a partial side view of a cross-section of one of the metal screws 504 in the enclosure. The enclosure base 510 includes the embedded conductive traces 508, shown individually as an upper trace 508a and a lower trace 508b. The offset upper trace 508a and lower trace 508b include conductive screw bosses 512 on the walls of a bore hole 514 for receiving the metal screw 504. As long as the metal screw 504 is in place in the bore hole 514, the conductive circuit is complete between the upper trace 508a and the lower trace 508b. With alternating upper and lower traces connecting the metal screws 504 in a series circuit, an electrical open circuit sensor is configured to detect removal of any one of the metal screws 504.

FIG. 5C shows a circuit schematic 520 for the enclosure open detection circuit. The conductive traces electrically connect the metal screws in series between a low voltage power supply Vcc and a ground terminal. A pull-down resistor R1 may ensure the circuit sits at normal low. The metal screws act as switches S1, S2, . . . , S6, capable of open circuiting the traces. A switch de-bounce circuit 522 may connect the traces to an interrupt pin on a controller 524, where the controller 524 serves as the enclosure open circuit detector. If one of the metal screws is removed, the signal is pulled high at the interrupt pin, resulting in the controller 524 detecting the open enclosure condition.

Figure 6:
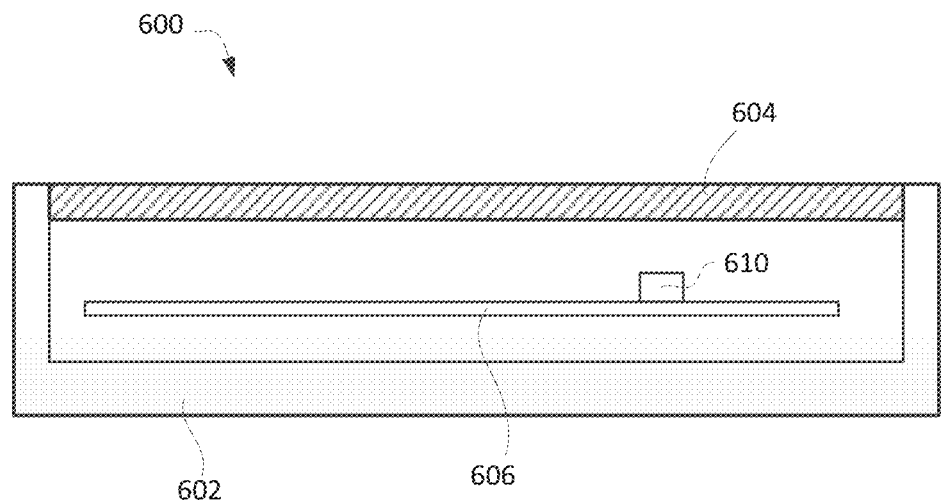
FIG. 6 shows a cross-sectional side view of an enclosure using an ambient light sensor for detecting an open enclosure event.

Reference is now made to FIG. 6, which shows a cross-sectional side view of an enclosure 600. The enclosure 600 may include an enclosure base 602 and cover 604. Within the enclosure, the electronics of the device may be provided on a main printed circuit board (PCB) 606. An ambient light sensor 610 may be located on the PCB 606 and oriented towards the cover 604 to detect an increase in ambient light above a threshold level resulting from removal of the cover 604.

In some other implementations, instead of the ambient light sensor 610, the device may be equipped with a magnetic sensor to detect a magnet attached to or embedded in the cover 604. The magnetic sensor may be a hall effect sensor, reed switch, or the like. In another example, the sensor may be an IR proximity sensor that is able to detect removal of the enclosure cover in the dark or in ambient light. In some cases, the sensor may be an inductive sensor and the cover may include or may be made of a metal material, such that removal of the cover may be detected by the inductive sensor. In yet another example, the sensor may be a capacitive sensor that can detect removal of the cover due to a more than threshold change in the electrostatic field. In yet a further example, the sensor may include a mechanical switch that is in contact with the cover, depressing the switch when the cover is in place on the enclosure, thereby enabling detection of the removal of the cover as a result of the mechanical change in the switch position. Other example mechanisms or sensors for detection of cover removal may be appreciated in light of the present description. In some cases, more than one sensor is used to detect cover removal and determination of an enclosure open condition is based on detecting cover removal with both sensors, or by detecting cover removal by at least one of the sensors.

Figure 7:
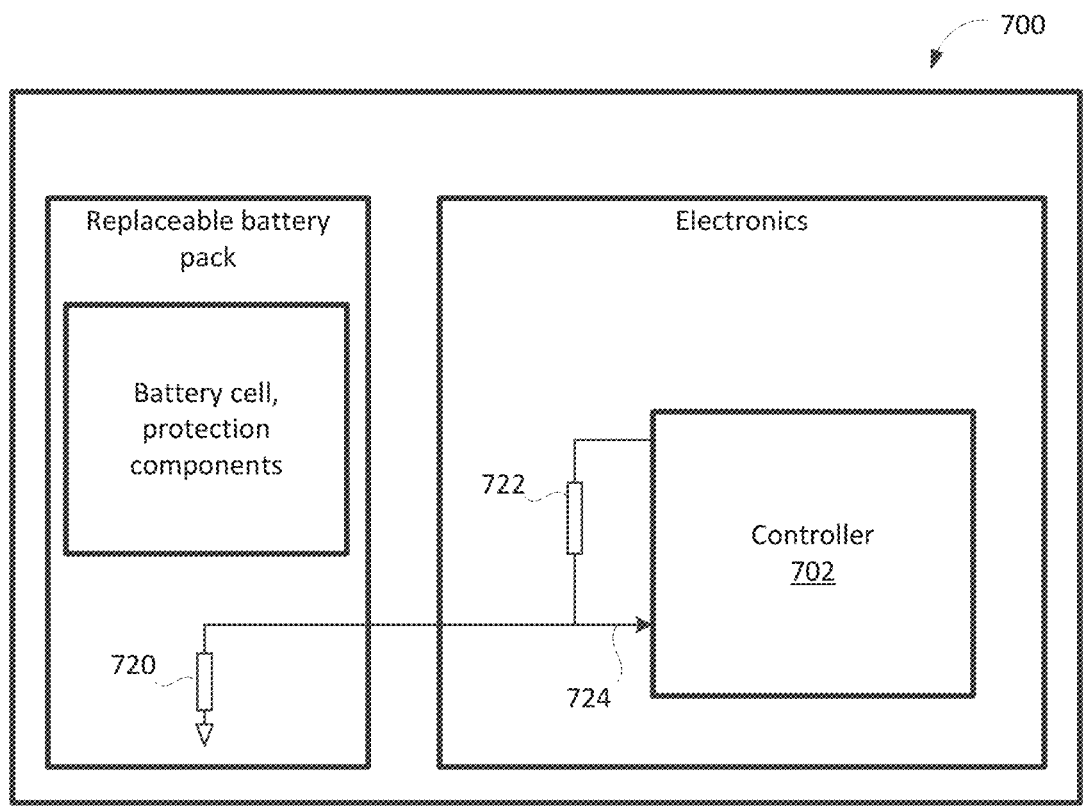
FIG. 7 shows another simplified block diagram of an asset tracking device.

Reference is now made to FIG. 7, which shows another simplified diagram of an asset tracking device 700 in an enclosure. The asset tracking device 700 includes, as part of its electronics, a controller 702. The device 700 further includes a removable battery pack. The battery pack and electronics are housed within an enclosure designed to be used within hazardous environments.

As noted above, in some cases a battery may be configured to output a serial number and a controller may be configured to detect a change in serial number as a mechanism for detecting a battery change. In this example, the battery pack is manufactured to have a semi-random ID resistor 720. The semi-random ID resistor 720 is a resistor having a value selected from a range of possible resistor values. The number of possible values in the range may be sufficiently large to make it fairly unlikely that any two random battery packs will have the same value resistor. In some cases, the range may be between 30-100 different values. The different values may, in some cases, be realized through a combination of resistors in various configurations.

The electronics may be configured, using a pull-up resistor 722, to provide a battery ID input signal 724. The battery ID input signal 724 is connected to an analog-to-digital input of the controller 702, thereby enabling the controller to determine the signal level based on the voltage drop across the ID resistor 720. A change in the previously recorded signal level indicates a change in battery. In some cases, the signal level (e.g. voltage reading) may be used to look up a table of digital ID codes and the digital ID code of a current battery is recorded in memory. When the controller 702 is powered on it may check the voltage level, look up the corresponding digital ID code, and compare it to the digital ID code stored in memory. A difference in ID code indicates a battery swap occurred when the device was powered off.

In one other variation, the controller 702 may be configured to use a current-weighted digital-analog-converter (e.g. IDAC) to drive current through the ID resistor to read back voltage, eliminating the need for the pull-up resistor 722.

The above discussed embodiments are considered to be illustrative and not restrictive. Certain adaptations and modifications of the described embodiments may be made. All such modification, permutations and combinations are intended to fall within the scope of the present disclosure.

The invention claimed is:

1. An electronic wireless device deployed for use in potentially hazardous locations, comprising:
   an enclosure;
   a battery;
   a sensor generating a first signal indicative of an open enclosure event indicating the enclosure has been opened;
   a wireless communication module;
   a location sensor;
   a controller configured to receive the first signal and to receive a second signal indicating a battery tamper event, to determine that the electronic wireless device is located in a hazardous environment and, responsive to that determination and based on detection of both the open enclosure event and the battery tamper event, to generate and transmit a tamper report to a remote server over a wireless communication channel using the wireless communication module; and
   a location sensor to output geolocation data to the controller, and wherein the controller is configured to compare the geolocation data from the location sensor with data defining hazardous locations to determine that the electronic wireless device is located in the hazardous environment.

2. The electronic wireless device of claim 1, wherein the sensor includes an ambient light sensor and the first signal is generated based on the ambient light exceeding a threshold level.

3. The electronic wireless device of claim 1, wherein the enclosure includes an enclosure base and a cover secured to the enclosure base by metal screws inserted in bore holes within the enclosure base, and wherein the enclosure base includes conductive traces connecting the metal screws in series, and wherein the sensor includes an open circuit sensor configured to detect removal of one or more of the metal screws.

4. The electronic wireless device of claim 1, wherein the sensor includes a magnetic sensor, an inductive sensor, a capacitive proximity sensor, or a mechanical switch.

5. The electronic wireless device of claim 1, wherein the second signal is received by the controller from the battery, wherein the second signal includes a serial number, wherein the controller is configured to compare the serial number to a previous serial number stored in memory, and wherein the controller is configured to detect the battery tamper event based on a mismatch between the serial number and the previous serial number.

6. The electronic wireless device of claim 1, wherein the second signal is a battery power signal, wherein the controller is configured to compare a voltage level of the battery power signal to a previous voltage level stored in memory, and wherein the controller is configured to detect the battery tamper event based on the voltage level exceeding the previous voltage level by more than a threshold amount.

7. The electronic wireless device of claim 1, further including non-volatile memory, wherein the controller is configured, following a power cycle event, to determine that the electronic wireless device is located in the hazardous environment and that the open enclosure event has occurred while in the hazardous environment by reading the non-volatile memory and, in response to those determinations, to determine from the second signal that the battery tamper event has occurred.

8. The electronic wireless device of claim 1, wherein the electronic wireless device is an intrinsically-safe device or an explosion-proof device.

9. A method of recording and reporting a tamper event for an electronic wireless device, the method comprising:
   determining that the electronic wireless device is located in a hazardous environment and, responsive to that determination,
      detecting a first signal from a sensor in the electronic wireless device indicating an open enclosure event, wherein the electronic wireless device has an enclosure and the open enclosure event indicates the enclosure has been opened;
   detecting a second signal indicating a battery tamper event; and
   based on detection of both the open enclosure event and the battery tamper event, generating and transmitting a tamper report to a remote server over a wireless communication channel,
   wherein determining that the electronic wireless device is located in the hazardous environment includes obtaining geolocation data using a location sensor and comparing the geolocation data to data defining hazardous locations to determine that the electronic wireless device is located in the hazardous environment.

10. The method of claim 9, wherein comparing includes transmitting the geolocation data to the remote server, comparing the geolocation data to the data defining hazardous locations at the remote server, and receiving at the electronic wireless device from the remote server a message indicating that the geolocation data corresponds to a hazardous location.

11. The method of claim 9, wherein the sensor includes an ambient light sensor and wherein detecting the first signal includes detecting the first signal generated by the ambient light sensor based on the ambient light exceeding a threshold level.

12. The method of claim 9, wherein the enclosure includes an enclosure base and a cover secured to the enclosure base by metal screws inserted in bore holes within the enclosure base, and wherein the enclosure base includes conductive traces connecting the metal screws in series, and wherein the sensor includes an open circuit sensor, and wherein detecting the first signal includes detecting an open circuit signal from the open circuit sensor based on removal of one or more of the metal screws.

13. The method of claim 9, wherein detecting the first signal includes detecting a signal indicating removal of a cover from the enclosure using a magnetic sensor, an inductive sensor, a capacitive proximity sensor, or a mechanical switch.

14. The method of claim 9, wherein detecting the second signal includes receiving the second signal from the battery, wherein the second signal includes a serial number, comparing the serial number to a previous serial number stored in memory, and detecting the battery tamper event based on a mismatch between the serial number and the previous serial number.

15. The method of claim 9, wherein detecting the second signal includes measuring a voltage level of a battery power signal, comparing the voltage level to a previous voltage level stored in memory, and detecting the battery tamper event based on the voltage level exceeding the previous voltage level by more than a threshold amount.

16. The method of claim 9, further comprising detecting a power cycle event and, following the power cycle event, determining that the electronic wireless device is located in the hazardous environment and determining that the open enclosure event has occurred based on reading a non-volatile memory and, in response to those determinations, determining from the second signal that the battery tamper event has occurred.

17. The method of claim 9, wherein the electronic wireless device is an intrinsically-safe device or an explosion-proof device.

18. An electronic wireless device deployed for use in potentially hazardous locations, comprising:
  an enclosure;
  a battery;
  a sensor generating a first signal indicative of an open enclosure event indicating the enclosure has been opened;
  a wireless communication module;
  a location sensor;
  a controller configured to receive the first signal and to receive a second signal indicating a battery tamper event, to determine that the electronic wireless device is located in a hazardous environment and, responsive to that determination and based on detection of both the open enclosure event and the battery tamper event, to generate and transmit a tamper report to a remote server over a wireless communication channel using the wireless communication module; and
  a location sensor to output geolocation data to the controller, and wherein the controller is configured to determine that the electronic wireless device is located in the hazardous environment by relaying the geolocation data to the remote server and receiving, from the remote server, a message indicating that the geolocation data corresponds to a hazardous location.

* * * * *

UNITED STATES PATENT AND TRADEMARK OFFICE
CERTIFICATE OF CORRECTION

PATENT NO. : 12,363,838 B2  
APPLICATION NO. : 18/303143  
DATED : July 15, 2025  
INVENTOR(S) : Jonathan Quinn Brubacher et al.

Page 1 of 1

It is certified that error appears in the above-identified patent and that said Letters Patent is hereby corrected as shown below:

On the Title Page

Item (71) Applicant, replace "Blackberry" with --BlackBerry--

Signed and Sealed this
Eighteenth Day of November, 2025

John A. Squires
*Director of the United States Patent and Trademark Office*